(12) United States Patent
Tramm et al.

(10) Patent No.: US 8,458,443 B2
(45) Date of Patent: Jun. 4, 2013

(54) VLIW PROCESSOR WITH EXECUTION UNITS EXECUTING INSTRUCTIONS FROM INSTRUCTION QUEUES AND ACCESSING DATA QUEUES TO READ AND WRITE OPERANDS

(75) Inventors: Matthias Tramm, Wildberg (CH); Manfred Stadler, Wettingen (CH); Christian Hitz, Zurich (CH)

(73) Assignee: SMSC Holdings S.A.R.L., Luxembourg (LU)

( * ) Notice: Subject to any disclaimer, the term of this patent is extended or adjusted under 35 U.S.C. 154(b) by 880 days.

(21) Appl. No.: 12/555,146

(22) Filed: Sep. 8, 2009

(65) Prior Publication Data

US 2010/0082947 A1    Apr. 1, 2010

Related U.S. Application Data

(60) Provisional application No. 61/095,062, filed on Sep. 8, 2008.

(51) Int. Cl.
*G06F 9/34* (2006.01)

(52) U.S. Cl.
USPC .......................................... 712/214; 712/220

(58) Field of Classification Search
None
See application file for complete search history.

(56) References Cited

U.S. PATENT DOCUMENTS

| | | | |
|---|---|---|---|
| 4,942,525 A * | 7/1990 | Shintani et al. ............... | 712/217 |
| 5,333,280 A | 7/1994 | Ishikawa et al. | |
| 5,878,267 A | 3/1999 | Hampapuram et al. | |
| 5,913,049 A | 6/1999 | Shiell et al. | |
| 5,940,342 A * | 8/1999 | Yamazaki et al. ....... | 365/230.03 |
| 5,941,983 A | 8/1999 | Gupta et al. | |
| 6,044,450 A | 3/2000 | Tsushima et al. | |
| 6,112,019 A * | 8/2000 | Chamdani et al. ............ | 712/214 |
| 6,311,261 B1 | 10/2001 | Chamdani et al. | |
| 6,401,190 B1 | 6/2002 | Nishioka et al. | |
| 6,526,421 B1 | 2/2003 | Houldsworth | |
| 6,684,320 B2 | 1/2004 | Mohamed et al. | |
| 6,738,837 B1 * | 5/2004 | Wyland .......................... | 710/25 |
| 6,965,981 B2 | 11/2005 | Nishioka et al. | |
| 7,089,402 B2 | 8/2006 | Tanaka | |
| 7,143,247 B1 | 11/2006 | Grossier | |
| 7,143,401 B2 | 11/2006 | Babaian et al. | |
| 7,181,595 B1 | 2/2007 | Siska | |
| 7,484,075 B2 | 1/2009 | Kailas | |
| 2002/0124157 A1 * | 9/2002 | Le et al. ........................ | 712/225 |
| 2004/0268098 A1 | 12/2004 | Almog et al. | |
| 2006/0224862 A1 | 10/2006 | Ahmed et al. | |

OTHER PUBLICATIONS

Smith, J.E. et al: "Varieties of Decoupled Access/Execute Computer Architectures" Proceedings of the Annual Allerton Conference on Communications, Control and Computing, Monticello, University of Illinois, US (11 pages), Oct. 1982.

Kurian L. et al: "Memory Latency Effects in Decoupled Architectures" IEEE Transactions on Computers, IEEE Service Center, Los Alamitos, CA, US (11 pages), Oct. 1994.

(Continued)

*Primary Examiner* — Kenneth Kim
(74) *Attorney, Agent, or Firm* — King & Spalding L.L.P.

(57) ABSTRACT

A processor may include a plurality of processing units for processing instructions, where each processing unit is associated with a discrete instruction queue. Data is read from a data queue selected by each instruction, and a sequencer manages distribution of instructions to the plurality of discrete instruction queues.

19 Claims, 5 Drawing Sheets

OTHER PUBLICATIONS

Smith J E: "Decoupled Access/Execute Computer Architectures" ACM Transactions on Computer Systems, ACM, New York, NY, US vol. 2, No. 4, (20 pages), Nov. 1984.

Notification of Transmittal of the International Search Report and the Written Opinion of the International Searching Authority, or the Declaration, filed in PCT/IB2009/006886 (14 pages), Apr. 12, 2009.

* cited by examiner

VLIW PROCESSOR WITH EXECUTION UNITS EXECUTING INSTRUCTIONS FROM INSTRUCTION QUEUES AND ACCESSING DATA QUEUES TO READ AND WRITE OPERANDS

CROSS-REFERENCE TO RELATED APPLICATION

This application claims priority to and the benefit of, and incorporates herein by reference in its entirety, U.S. Provisional Patent Application No. 61/095,062, which was filed on Sep. 8, 2008.

TECHNICAL FIELD

In various embodiments, the present invention relates to pipelined processors and architectures thereof, and in particular to improvement of very-long instruction word (VLIW) architectures including multiple processing units.

BACKGROUND

In a pipelined VLIW processor, instructions are carried out in parallel and each instruction is executed in sub-steps. As a result, several consecutive instructions of a program, each at a different stage, can be executed simultaneously. A VLIW system may utilize a complier that checks for dependencies among instructions of a program, and accordingly, determines the order of execution of instructions including which instructions can be executed in parallel. However, existing compilers are not configured to generate optimal programs for such a structure. As a result, programmers write VLIW programs including instructions tailored to run in parallel across multiple processing units of a VLIW processor. Typical programming methodologies entail determining the order of execution of instructions in advance, and accurately predicting the availability of desired input data at the processing units. It may also be necessary to predict the availability and processing load of each processing unit, as different processing units may handle instructions of different sizes (i.e., different numbers of sub-steps). In these cases, "No Operation" (NOP) instructions are inserted in a program to synchronize the load at multiple processing units, but the use of NOP instructions decreases program density and results in a sub-optimal program code, which, in turn, may warrant the use of code-compression techniques. In general, programming a VLIW processor with multiple processing units is complicated because the correct data must be at the correct place (i.e., processing unit) at the correct time.

In addition, conventional VLIW architectures include one or more instruction queues commonly shared by a plurality of processing units to fetch instructions, and a plurality of data queues, each of which is assigned to only one processing unit to read and write data. Unfortunately, such architectures result in a slower program execution, as they do not provide flexibility in terms of reducing the time to fetch instructions, nor do they dynamically utilize a plurality of data queues to read data and write data.

SUMMARY

Embodiments of the present invention address programming issues for a VLIW processor by eliminating the need for instruction scheduling among multiple processing units of a VLIW processor. In one embodiment, an instruction is executed by a processing unit only if the appropriate data is available to that processing unit, and therefore the need for explicit synchronization among the processing units is eliminated. To reduce the execution time of a program, embodiments of the invention include a processor architecture in which every processing unit has its own discrete instruction queue, as well as multiple data queues selectable by the processing units.

The processor architecture includes a sequencer and a series of processing units such as load units, store units, execution units, and data queues. Each load unit reads data out of the system memory and stores the data in a selected data queue. An execution unit consumes the data out of selected data queues, processes the data, and stores the result data back in a selected data queue. A store unit reads the data out of a selected data queue and stores the data in the system memory. A main sequencer manages the control flow and distributes instructions for the multiple processing units individually in the instruction queues. In various embodiments of the invention, an instruction is only executed if the appropriate data is available and if any generated data may be stored. In general, instruction execution within a processing unit is stalled by an empty input queue or a full output queue or both. The data is consumed and may only be read once, although data (e.g., constants) that are used more often may be stored within a processing unit.

In an aspect, embodiments of the invention feature a processor, for use in connection with a system memory, that includes a load unit, an execution unit, a store unit, and a sequencer. The load unit fetches a first instruction from a first unique instruction queue and processes the first instruction, the processing including or consisting essentially of reading data out of the system memory and storing the read data in a first data queue. The execution unit fetches a second instruction from a second unique instruction queue and processes the second instruction, the processing including or consisting essentially of reading the data from the first data queue, processing the data, and storing the processed data in a second data queue. The store unit fetches a third instruction from a third unique instruction queue and processes the third instruction, the processing including or consisting essentially of reading the data from the second data queue and storing the data in the system memory. A sequencer manages distribution of instructions to the first, second, and third instruction queues.

Embodiments of the invention may include one or more of the following. The processor may include multiple additional load units each associated with a discrete instruction queue. The sequencer may be configured to issue each of the first, second, and third instructions only to the first, second, or third instruction queue, respectively. The sequencer may not be configured to combine multiple instructions into a single instruction, and/or may not be configured to send "no operation" instructions to any of the instruction queues. The first data queue may be selected by the first instruction, and/or the second data queue may be selected by the second instruction. The execution unit may be configured to store constant data from the first data queue within the execution unit. The processor may include at least one additional first data queue for storing read data, and processing the first instruction at the load unit and processing the second instruction at the execution unit may include selecting one of the first data queues. The processor may include at least one additional second data queue for storing processed data, and processing the second instruction at the execution unit and processing the third instruction at the store unit may include selecting one of the second data queues.

In another aspect, embodiments of the invention feature a processor including a plurality of processing units and a sequencer. Each processing unit is associated with a discrete instruction queue and processes instructions, the processing including or consisting essentially of reading data from a data queue selected by each instruction. The sequencer manages distribution of instructions to the plurality of discrete instruction queues. The sequencer may be configured to issue each instruction to only a single instruction queue. Each instruction may include or consist essentially of a plurality of instruction fields unequal in number to the plurality of processing units.

In yet another aspect, embodiments of the invention feature a method of processing data. A first instruction is fetched from a first unique instruction queue and processed, the processing including or consisting essentially of reading data out of the system memory and storing the read data in a first data queue. A second instruction is fetched from a second unique instruction queue and processed, the processing including or consisting essentially of reading the data from the first data queue, processing the data, and storing the processed data in a second data queue. A third instruction is fetched from a third unique instruction queue and processed, the processing including or consisting essentially of reading the processed data from the second data queue and storing the processed data in the system memory. The distribution of instructions to the first, second, and third instruction queues is managed. The managing step may include or consist essentially of issuing each of the first, second, and third instructions only to the first, second, or third instruction queue, respectively.

In another aspect, embodiments of the invention feature a method of fabricating a processor including or consisting essentially of providing a plurality of processing units and a sequencer. Each processing unit is associated with a discrete instruction queue and processes instructions, the processing including or consisting essentially of reading data from a data queue selected by each instruction. The sequencer manages distribution of instructions to the discrete instruction queues. The sequencer may be configured to issue each instruction only to a single instruction queue.

In an additional aspect, embodiments of the invention feature a method of processing data. A plurality of instructions corresponding to a computing job is received. Each instruction is sent to a discrete instruction queue associated with one of a plurality of processing units. A first data queue is selected with the processing unit based on the instruction, and data is read from the first data queue with the processing unit. A second data queue is selected with the processing unit based on the instruction, and data is written to the second data queue with the processing unit.

Embodiments of the invention may feature one or more of the following. Dependencies among the plurality of instructions may not be identified prior to the instructions being sent to the discrete instruction queues. Each instruction may include or consist essentially of a plurality of instruction fields unequal in number to the plurality of processing units. The plurality of instructions may not include a "no operation" instruction. A first discrete instruction queue may include a first plurality of instructions unequal in number to a second plurality of instructions in a second discrete instruction queue. Each instruction may include or consist essentially of an opcode and at least one data queue selection indicator for selecting the first data queue or the second data queue.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
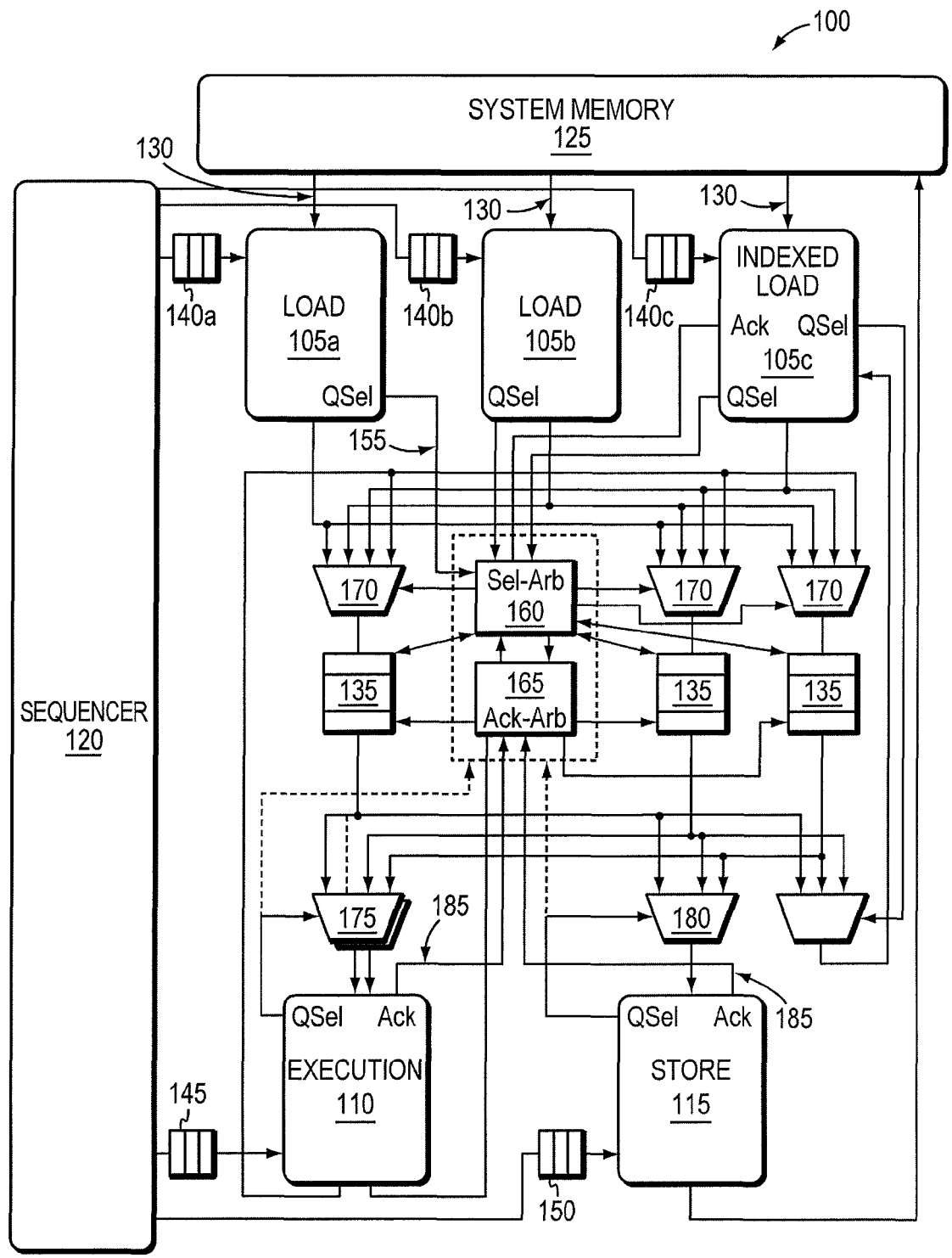
FIG. 1 is a schematic flow diagram of an exemplary processor in accordance with various embodiments of the invention.

FIG. 1 depicts an exemplary processor in accordance with various embodiments of the invention. The processor 100 includes or consists essentially of a plurality of processing units such as load units 105, an execution unit 110, a store unit 115, and a sequencer 120. The processor 100 is typically a part of a computer system (not shown), which includes a system memory 125 to which load units 105 and store units 115 are directly connected through input/output ports 130 of the processor 100. The load units 105, the execution unit 110, and the store unit 115 all interact through one or more data queues 135, which may be implemented as first-in first-out (FIFO) memories. Each processing unit receives instructions from the sequencer 120 through an associated instruction queue. For example, load units 105a, 105b, and 105c receive instructions through their respective instruction queues 140a, 140b, and 140c. Similarly, the execution unit 110 has an independent instruction queue 145, and store unit 115 receives instructions through an instruction queue 150. The processing units may select a data queue (as described below) from among the data queues 135, to read data from and write data to, by providing selection signals 155 to a selection unit 160 and receiving acknowledgements from an acknowledgement unit 165. Data from the load units 105 and the execution unit 110 may be written in a data queue 135 only from one unit addressing that queue at a time, a constraint enforced by a series of multiplexers 170 each connected to one of the data queues 135. Similarly, the execution unit 110 and the store unit 115 read data from one data queue 135 at a time through multiplexers 175 (denoting two similarly configured multiplexers each connected to a different data queue 135) and 180, respectively. Upon reading data from the data queues 135, the execution unit 110 and the store unit 115 may send acknowledgements 185 to the acknowledgement unit 165 to update the status of the data queues 135.

The sequencer 120 of the processor 100 receives a set of program instructions corresponding to one or more computing jobs, and manages the distribution of the received instructions to the instruction queues 140, the instruction queue 145, and the instruction queue 150. Unlike a typical VLIW system, the sequencer 120 does not check for dependencies among instructions before sending those instructions (for parallel processing) to the instruction queues assigned to the load units 105, the execution unit 110, and the store unit 115.

Generally, in a conventional VLIW system, a long instruction containing a plurality of "instruction fields" is sent to all the processing units for parallel execution. Each instruction field is associated with a particular operation and, therefore, only controls the processing unit which handles that operation. In other words, the number of instruction fields in a VLIW instruction is equal to the number of processing units in a processor, but if a particular processing unit is not used in a VLIW instruction, the instruction field corresponding to this processing unit is assigned a NOP instruction. The NOP instructions maintain synchronization among all the processing units while a VLIW instruction is executed, but force one or more processing units to remain unutilized, at least until receipt of the next VLIW instruction. In addition, as NOP instructions are embedded in a number of VLIW instructions, the total number of VLIW instructions needed to execute one computing job increases. Therefore, the processor efficiency is affected adversely.

In contrast, the sequencer 120 does not combine multiple instructions destined for different processing units into a single instruction, and does not send a single instruction to all the processing units. Indeed, depending on the instruction type, the sequencer 120 instead issues instructions to the appropriate processing unit (a load unit 105, execution unit 110, or store unit 115) through its own instruction queue (140, 145, or 150, respectively). This eliminates any need for checking dependencies among instructions or inserting NOP instructions into a single VLIW instruction. Therefore, a variable pipeline depth (i.e., an unequal number of instructions in an instruction queue) is allowed, and no synchronization is required at the processing units.

Figure 2A:
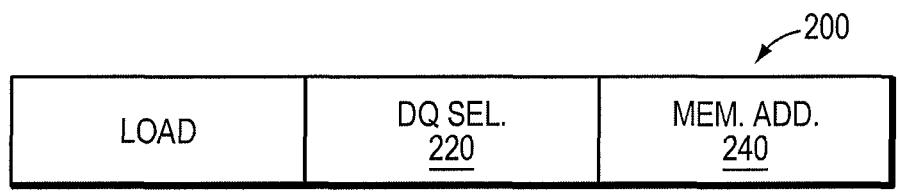
FIGS. 2A-2C are exemplary structures of instructions sent to various processing units in accordance with various embodiments of the invention.
Figure 2B:
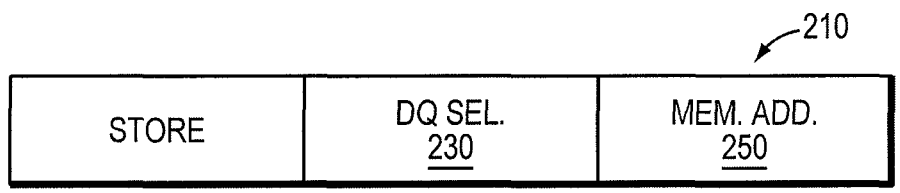
Figure 2C:
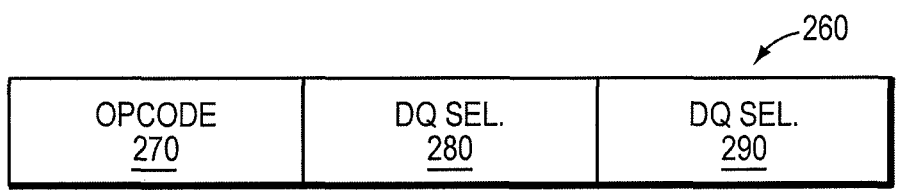

A typical processor instruction issued by the sequencer 120 includes an instruction opcode and one or more source operand locations. Depending upon the opcode, the operands include data that are (a) read from the system memory 125 and written to the data queues 135 (e.g., by the load units 105), (b) read from and written to the data queues 135 (e.g., by the execution unit 110), or (c) read from the data queues 135 and written to the system memory 125 (e.g., by the store unit 115). Each processing unit of the processor 100 performs a computation on the input operand(s) according to the opcode, and stores the result in destination operand(s). The types of instructions issued by the sequencer 120, and executed by the processing units of the processor 100, are shown in FIGS. 2A-2C. FIGS. 2A and 2B show the structure of instructions 200, 210 sent to the load units 105 and the store unit 115, respectively. Instructions 200, 210 include a "LOAD" or "STORE" opcode, respectively, a data queue selection indicator (220 or 230), and an address location (240 or 250) in the system memory 125 to transfer the operand data. FIG. 2C shows an instruction structure 260 for the execution unit 110, which includes an opcode 270 corresponding to the type of computation handled by the execution unit 110, a data queue selection indicator 280 (for input), and a data queue selection indicator 290 (for output). The opcode 270 generally includes three operands, two for input and one for output; each of the two input operands is applied to one of the multiplexers 175 (see FIG. 1).

Figure 3A:
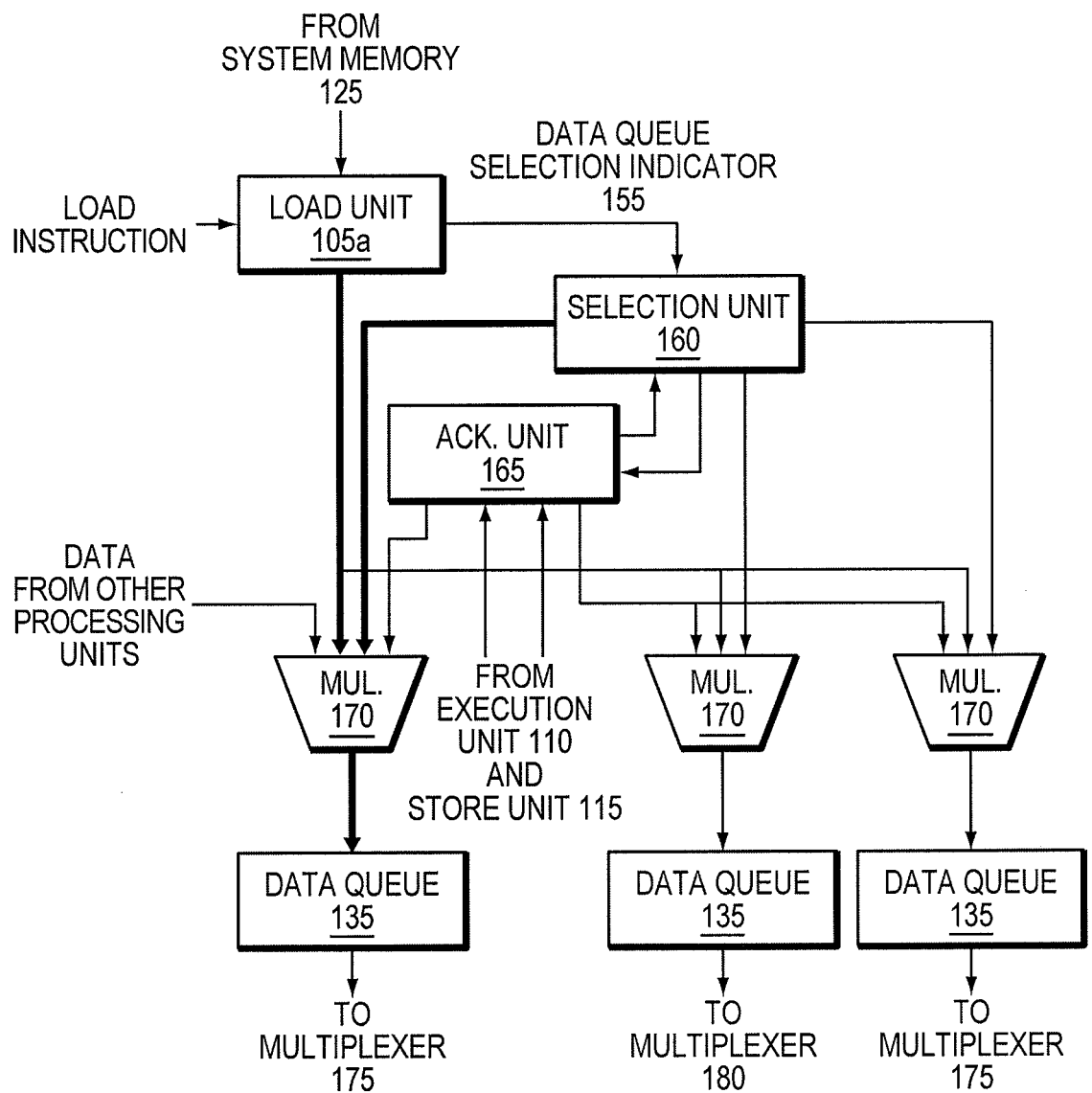
FIGS. 3A-3C are exemplary information-processing flowcharts in accordance with various embodiments of the invention.

As discussed above, every processing unit in the processor 100 has its own instruction queue and reads data out of selectable data queues. An instruction is only executed if the appropriate operand data is available from and if the generated data (if any) may be stored in one of the data queues 135. Desirably, the data is consumed and read only once, although data (e.g., constants) that are used more often may be stored within a processing unit. FIG. 3A shows an example of the instruction processing carried out by one of the load units 105. Each load unit 105 fetches a "LOAD" instruction (issued by the sequencer 120) from its instruction queue 140 and executes the instruction. The execution at the load unit 105 includes reading data from the memory location 240 of the system memory 125 and storing the data in a selected data queue 135. Output data from the load unit 105 are sent to all of the multiplexers 170 (each of which is directly associated with one data queue 135), and based on the data queue selection indicator 220 (within the instruction), a data queue 135 to store the output data is selected by (a) sending a selection signal 155 from the load unit 105 to the selection unit 160, (b) receiving an acknowledgement from the acknowledgement unit 165 that space in the data queue 135 is available, and (c) selecting the designated data queue 135 by sending a signal from the selection unit 160 to the respective multiplexer 170. In FIG. 3A, bold arrows indicate the signal from the selection unit 160 to the multiplexer 170, and the corresponding selection of the output data from the load unit 105 to be stored in the data queue 135. The stored data is then available for reading and/or processing by other processing units, such as the execution unit 110 or the store unit 115. If there is a negative acknowledgement indicating that the desired data queue 135 is full, the output data is temporarily stored within the load unit 105 until space in the data queue 135 becomes available.

Figure 3B:
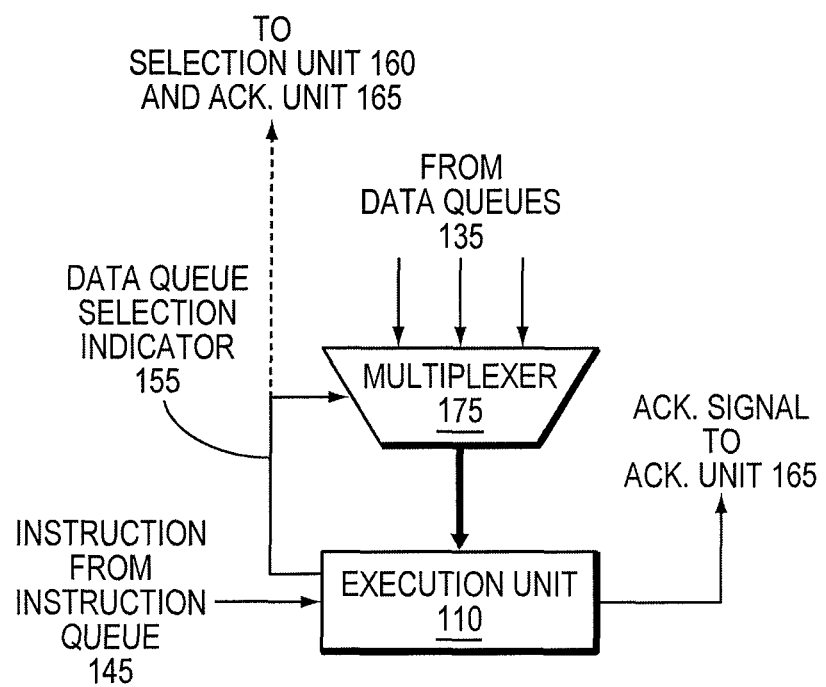
Figure 3C:
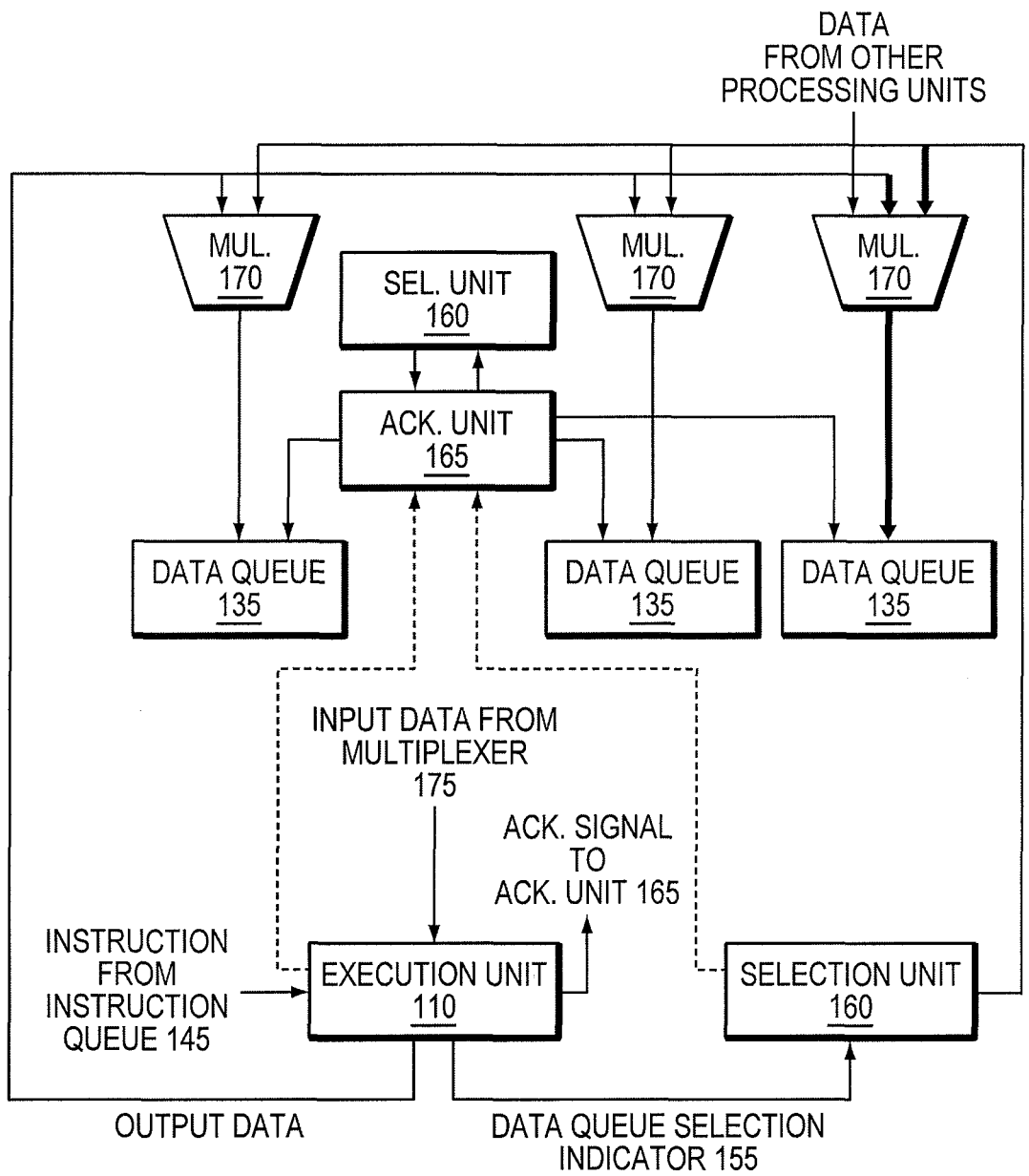

Output from each data queue 135 is sent to the multiplexers 175 and 180, each of which allows data from only one of the data queues 135 to be fed to the execution unit 110 (so that the execution unit 110 receives data from two queues 135 via the two multiplexers 175) or the store unit 115. As shown in FIG. 3B, the execution unit 110 fetches an instruction from its instruction queue 145, and based on the opcode 270 and the (input) data queue selection indicator 280, receives the input data by (a) sending a request to the selection unit 160, (b) receiving an acknowledgement from the acknowledgement unit 165 that data is available, and (c) retrieving the input data from the desired data queue 135 (shown in bold) by sending an input selection signal to the associated multiplexers 175. The execution unit 110 processes the input data according to the opcode 270, and uses the data queue selection indicator 290 in the same manner as the load units 105 to select a particular data queue to store the processed data. As shown in FIG. 3C, the execution unit 110 sends an output selection signal to the selection unit 160, and receives an acknowledgement that space in a desired data queue 135 is available. The selection unit 160 then enables the appropriate multiplexer 170 to store the data in the desired data queue 135. The stored data is thereafter available for accessing and processing by other processing units (e.g., the store unit 115).

The store unit 115 fetches a "STORE" instruction from its instruction queue 150, and based on the data queue selection indicator 230, receives data from one of the data queues 135. The store unit 115, like the execution unit 110, sends a request to the selection unit 160, receives an acknowledgement from the acknowledgement unit 165 that data is available, and retrieves the input data from the desired data queue 135 by sending an input selection signal to the multiplexer 180. The store unit 115 stores the received data in the system memory 125 at the memory location 250.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A processor for use in connection with a system memory, the processor comprising:
   a load unit for fetching a first instruction from a first unique instruction queue and processing the first instruction, the processing comprising (i) reading data out of the system memory, and (ii) storing the read data in a first data queue;
   an execution unit for fetching a second instruction from a second unique instruction queue and processing the second instruction, the processing comprising (i) reading the data from the first data queue, (ii) processing the data, and (iii) storing the processed data in a second data queue;
   a store unit for fetching a third instruction from a third unique instruction queue and processing the third instruction, the processing comprising (i) reading the processed data from the second data queue, and (ii) storing the processed data in the system memory; and
   a sequencer for managing distribution of instructions to the first, second, and third instruction queues.

2. The processor of claim 1, further comprising a plurality of additional load units each associated with a discrete instruction queue.

3. The processor of claim 1, wherein the sequencer is configured to issue each of the first, second, and third instructions only to the first, second, or third instruction queue, respectively.

4. The processor of claim 1, wherein the sequencer is not configured to combine multiple instructions into a single instruction.

5. The processor of claim 1, wherein the sequencer is not configured to send "no operation" instructions to any of the first, second, or third instruction queues.

6. The processor of claim 1, wherein the first data queue is selected by the first instruction and the second data queue is selected by the second instruction.

7. The processor of claim 1, wherein the execution unit is further configured to store constant data from the first data queue within the execution unit.

8. The processor of claim 1, further comprising at least one additional first data queue for storing read data.

9. The processor of claim 8, wherein processing the first instruction at the load unit and processing the second instruction at the execution unit further comprises selecting one of the first data queues.

10. The processor of claim 1, further comprising at least one additional second data queue for storing processed data.

11. The processor of claim 10, wherein processing the second instruction at the execution unit and processing the third instruction at the store unit further comprises selecting one of the second data queues.

12. A method of processing data, the method comprising:
   fetching a first instruction from a first unique instruction queue and processing the first instruction, the processing comprising (i) reading data out of the system memory, and (ii) storing the read data in a first data queue;
   fetching a second instruction from a second unique instruction queue and processing the second instruction, the processing comprising (i) reading the data from the first data queue, (ii) processing the data, and (iii) storing the processed data in a second data queue;
   fetching a third instruction from a third unique instruction queue and processing the third instruction, the processing comprising (i) reading the processed data from the second data queue, and (ii) storing the processed data in the system memory; and managing distribution of instructions to the first, second, and third instruction queues.

13. The method of claim 12, wherein the managing step comprises issuing each of the first, second, and third instructions only to the first, second, or third instruction queue, respectively.

14. A method of processing data, the method comprising:
   receiving a plurality of instructions corresponding to a computing job;
   sending each instruction to one of a plurality of discrete instruction queues, wherein the plurality of discrete instruction queues includes a first discrete instruction queue associated with a first processing unit of a plurality of processing units and a second discrete instruction queue associated with a second processing unit of the plurality of processing units;
   selecting, with the first processing unit, a first data queue specified by a first instruction retrieved from the first discrete instruction queue;
   reading data from the first data queue with the first processing unit;
   selecting, with the second processing unit, a second data queue specified by a second instruction retrieved from the second discrete instruction queue; and
   writing data to the second data queue with the second processing unit.

15. The method of claim 14, wherein dependencies among the plurality of instructions are not identified prior to sending the instructions to the discrete instruction queues.

16. The method of claim 14, wherein each instruction comprises a plurality of instruction fields unequal in number to the plurality of processing units.

17. The method of claim 14, wherein the plurality of instructions does not comprise a "no operation" instruction.

18. The method of claim 14, wherein the first discrete instruction queue comprises a first plurality of instructions unequal in number to a second plurality of instructions in the second discrete instruction queue.

19. The method of claim 14, wherein each instruction comprises an opcode and at least one data queue selection indicator for selecting the first data queue or the second data queue.

* * * * *